May 25, 1948.  J. RODWAY  2,442,020
REACTION VALVE DEVICE FOR TRACTOR-TRAILER BRAKE OPERATION
Filed Nov. 25, 1944   3 Sheets-Sheet 1
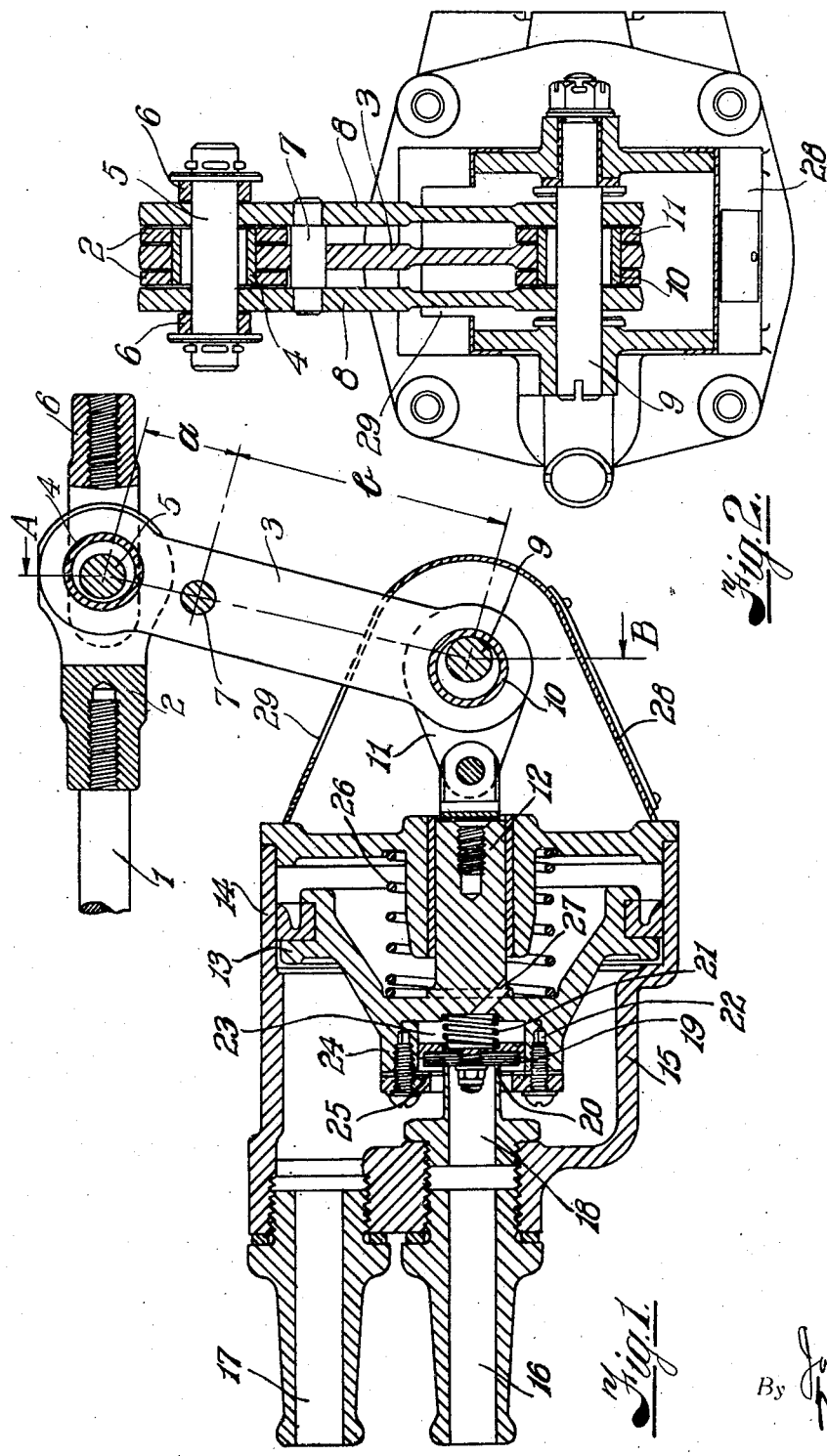

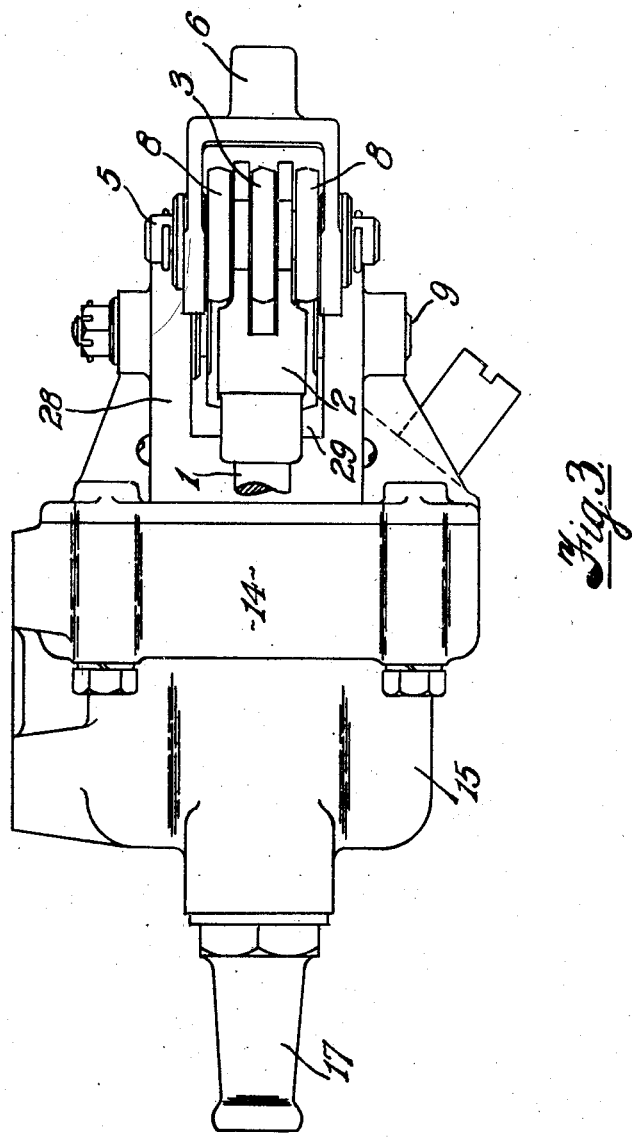

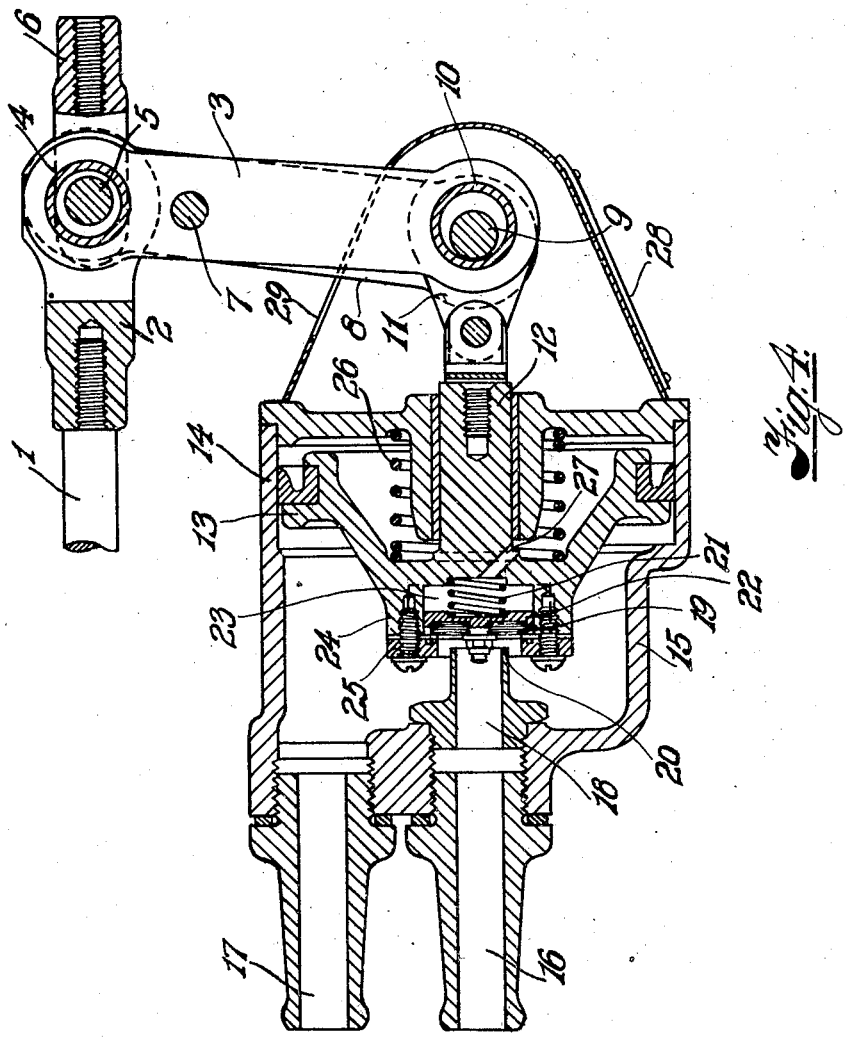

Patented May 25, 1948

2,442,020

UNITED STATES PATENT OFFICE 2,442,020

REACTION VALVE DEVICE FOR TRACTOR-TRAILER BRAKE OPERATION

John Rodway, Lincoln, England

Application November 25, 1944, Serial No. 565,157
In Great Britain October 4, 1943

4 Claims. (Cl. 188—3)

This invention relates to means for controlling the brakes on trailer vehicles and the rear portions of articulated vehicles and has for its object to provide an improved construction or arrangement of a mechanical character designed to avoid unnecessary complication on the tractor vehicle and to provide for a graduated brake application proportional to the effort applied.

The invention is applicable to brake operation by vacuum or pressure actuated means and is capable of mechanical adaptation to suit the requirements of vehicles of varying types.

According to the invention a device for controlling the operation of the brakes on a trailer vehicle or the like is provided wherein pressure applied to a pedal is transmitted through a system of levers movable about a common pivot to a valve whose opening causes the application of differential fluid pressure to a brake cylinder or cylinders with a force proportional to the pedal effort, such force being also applied through means forming part of the valve actuating mechanism to a reaction lever included in said lever system.

According to the preferred form of the invention a device for controlling the operation of the brakes on a trailer vehicle or the like comprises a valve adapted to control the application of vacuum or pressure fluid to brake actuating mechanism, a pedal actuated rod, levers movable in opposite directions about a common pivot, one of said levers having a connection to said pedal actuated rod and a lost motion connection to means for actuating said valve and another of said levers being movable about a fixed pivot at one end and having a connection to an output rod at the opposite end.

Reference will now be made to the accompanying drawings which illustrate a vacuum reaction valve according to the invention and in which—

Fig. 1 is a longitudinal sectional elevation showing the inoperative position,

Fig. 2 is a cross section taken on the line A—B of Fig. 1,

Fig. 3 is a plan of Fig. 1 and

Fig. 4 is a sectional elevation similar to Fig. 1 but showing an operative position.

The reaction valve illustrated in the drawings is adapted to be interposed between a brake operating pedal and a cross shaft on a tractor vehicle through which movement is transmitted to the mechanism for applying the tractor brakes. A pedal operated rod indicated at 1 is connected to a fork 2 connected to a reaction lever 3 mounted at its upper end over a sleeve 4 which surrounds, but is of substantially greater internal diameter than, a pin 5 which is carried in a second fork 6 in turn connected through a rod to the cross shaft on the tractor vehicle. Passing through the reaction lever 3 is a pivot pin 7 about which are also movable two outer levers 8 which act together and are fixed around the pin 5 at their upper ends and around a fixed pin 9 at their lower ends.

The reaction lever 3 has also a lost motion connection with the pin 9, the said lever being mounted at its lower end over a sleeve 10 of substantially greater internal diameter than the diameter of the pin 9. The said sleeve is also connected by a link 11 with the rod 12 of a piston 13 movable in a cylinder 14 forming part of a valve housing 15 but separated therefrom by the piston 13.

The valve housing 15 has a port 16 adapted to be connected to a source of vacuum and a second port 17 adapted to be connected to the conventional brake cylinders on the trailer vehicle. The port 16 communicates with a passage 18 within the valve housing 15 whose inner end is adapted to be closed by a valve member 19 which engages the end of a tubular seating 20 forming the inner extremity of the passage 18. The valve member 19 is normally urged into its closed position by a spring 21 acting upon a disc 22 which is secured centrally to the valve member, both disc and valve being movably mounted within a valve chamber 23 formed within an extension 24 of piston 13, which extension surrounds the tubular valve seating 20 and terminates in an inwardly directed annular flange 25 constituting a valve member, which is adapted to engage the valve member 19 as hereinafter described.

The piston 13 is normally urged into the position shown in Fig. 1 by a spring 26 whose outer end bears against the end wall of the cylinder 14 and the piston is formed with a port or passage 27 which enables communications to be established between the cylinder 14 and the valve housing. The housing 15 has an extension 28 in which the ends of the pin 9 are mounted and the extension has a slot 29 on its upper side through which the levers 3 and 8 project and which limits the extent of pivotal movement of the said levers.

The operation of the device above described is as follows:

During the initial movement of the brake actuating pedal, the pivot pin 7 is held against movement by the cross shaft return springs, and, therefore, during the initial movement, the reaction lever 3 is moved about the pin 7 to the extent permitted by the clearances between pin 5 and sleeve 4 and pin 9 and sleeve 10. This movement is communicated through link 11 to the piston rod 12 and piston 13 which is drawn to the right so that the flange 25 first engages the valve member 19 and seals the valve housing against ingress of air and secondly unseats the valve member 19 so that suction is exerted through passages 16, 18 and 20 to place the interior of the valve housing under vacuum which is also exerted through port 17 and the brake operating cylinders on the trailer vehicle.

During the initial stage of brake operation, the pins 4 and 7 remain stationary so that the lever 3 is moved out of alignment with the levers 8 owing to the pivotal movement of lever 3 about the pin 7 and the parts of the device are in the positions shown in Fig. 4.

The vacuum exerted in the valve housing 15, thereafter, tends to move the piston 13 towards the left and re-seat the valve member 19 so that the force required to reopen the valve member 19 will become greater as the vacuum in the housing 15 and the conventional brake cylinders on the trailer vehicle increases.

Any increase of vacuum in the valve housing 15 tends, by returning the valve member 19 to closing position, to oppose the separation of the levers 3 and 8 in the manner shown in Fig. 4 and the movement thus imparted to the reaction lever 3 is transmitted to the pedal so that the operator can "feel" the increase in braking pressure.

The force applied by the brake operating pedal acting about the length $a$ of the reaction lever 3 is balanced by the reaction of valve piston 13 acting about the length $b$ of the reaction lever. During brake application, the pull transmitted to the brake cross shaft from the fork 6 thus remains exactly the same value as if it were connected directly to the pedal and the only effect of the valve on the pedal is that the clearances at the upper and lower ends of the reaction lever cause a very slight lost motion at the pedal. As the brake applying effort is relaxed the suction in the valve housing 15 aided by the spring 26 tends to restore the piston 13 and the valve 19 to the positions shown in Fig. 1, wherein air flowing through the passage 27 will reduce the degree of vacuum in the housing 15 and also in the trailer brake cylinders in proportion to the reduced load on the fork 2.

In the event of failure of vacuum through any cause, the brakes on the tractor vehicle, which may be of the usual or conventional form, will be operated mechanically with a slight initial lost motion at the pedal, the levers 3 and 8 moving around pin 9 in an anti-clockwise direction as the pull is applied through rod 1.

It is to be understood that various modifications may be made in the device above described without departing from the invention. For example, to apply the invention to the control of fluid pressure operated brake mechanism, the position of the valve member 19 would have to be revised so that it would normally be held on its seating by pressure and mechanically unseated to allow the pressure fluid to operate in the valve housing, such operation being arranged so as to move the piston towards the left.

The mechanical transmission components can also be arranged to operate under thrust instead of pull and the device can be adapted to suit varying requirements by such variation as arranging the fork 6 in a reverse position and connecting it to an output rod lying in substantially the same direction as the pedal rod 1.

I claim:

1. A device for controlling the operation of the brakes on a trailer vehicle, comprising a valve for controlling the application of differential fluid pressure to the brake cylinder, a pedal operated rod, and a system of levers for transmitting pressure applied to the pedal to said valve to open it and thereby cause application of differential fluid pressure to the brake cylinder with a pressure proportional to the pedal effort, said system of levers including a reaction lever connected at one end to the rod and having means connected to its other end for actuating said valve, a fixed pivot, a sleeve connected to the rod, said reaction lever having at one end a lost motion connection to said fixed pivot and pivotally mounted at its opposite end on said sleeve, another lever of said system being movable at one end about said fixed pivot and having a lost motion connection between its opposite end and said sleeve, and an output member connected to said other lever, and a pivot pin connecting said levers intermediately of their ends and about which the reaction lever is movable.

2. A device according to claim 1, wherein said valve is provided with a valve chamber communicating with the brake cylinder and having a passage through which differential fluid pressure is applied to said valve chamber, and a piston in said valve chamber responsive to the differential fluid pressure in said chamber to close the valve and oppose operative movement of said reaction lever.

3. A device according to claim 1, wherein said valve comprises a housing having a cylinder forming a part thereof, a piston operating in said cylinder, and a valve member carried by said piston, and including a link connecting said other end of said reaction lever to said piston, said valve member being arranged to be unseated by operation of said piston to enable differential fluid pressure to be applied to the brake cylinder.

4. A device according to claim 1, wherein said valve comprises a housing having a cylinder forming a part thereof, a piston operating in said cylinder, and a valve member carried by said piston, and including a link connecting said other end of said reaction lever to said piston, said valve member being arranged to be unseated by operation of said piston to enable differential fluid pressure to be applied to the brake cylinder, and said system of levers comprising a pair of levers connected at one end to said output member and at the opposite end to said fixed pivot, and said pivot pin about which said reaction lever is movable is mounted in said pair of levers.

JOHN RODWAY.

REFERENCES CITED

The following references are of record in the file of this patent:

UNITED STATES PATENTS

| Number | Name | Date |
| --- | --- | --- |
| 1,882,411 | Doty | Oct. 11, 1932 |
| 1,999,456 | Hickman | Apr. 30, 1935 |
| 2,111,322 | Johnson | Mar. 15, 1938 |
| 2,232,974 | Roy | Feb. 25, 1941 |